Nov. 15, 1960 M. L. THORPE 2,960,594
PLASMA FLAME GENERATOR
Filed June 30, 1958 4 Sheets-Sheet 1

Fig. 1

INVENTOR
MERLE LEE THORPE

BY Burgess, Dinklage & Sprung
ATTORNEYS

STABILITY OF PLASMA FLAME GENERATOR

Fig. 6

INVENTOR
MERLE LEE THORPE

BY Burgess, Dinklage & Sprung
ATTORNEYS

United States Patent Office 2,960,594
Patented Nov. 15, 1960

2,960,594

PLASMA FLAME GENERATOR

Merle Lee Thorpe, Norwich, Vt., assignor to Plasma Flame Corporation, a corporation of New York Filed June 30, 1958, Ser. No. 745,681

35 Claims. (Cl. 219—75)

Apparatuses for flame heating are very commonly used throughout industry for innumerable heating purposes, such as welding, brazing, heat treating furnaces, chemical processes, etc. Generally flame heating apparatuses are those supplying a flow of gases which are chemically combined to produce the heat of the flame, but the word "flame" has also been used to denote flames of a single gas which has been dissociated into individual atoms, which then recombine to form the heat of the "flame." Such a flame is, for instance, the atomic hydrogen flame. The word "flame" has also been used in conjunction with the ionized stream of an electric arc which is sometimes referred to as the arc "flame." As a result of this terminology, arc devices have sometimes been called arc torches, even in cases where no gas other than the surrounding atmosphere has been applied to such "torch."

The primary objective of all such flame heating apparatuses is to transfer heat from such apparatuses to a substance to be heated.

All such previously known flame heating apparatuses have been subject to some very fundamental limitations. All of those which depend upon chemical combustion as a source of heat from the flame are subject to the very distinct limitation of their low obtainable temperatures. The hottest known readily available commercial flame is the oxy-acetylene flame, which has a maximum flame temperature of the order of 5,600° F. It is true that many chemical flames are now known which exceed the temperature limitation of the oxy-acetylene flame, but such flames for one reason or another are not commercially practical. For instance, it is known that higher temperatures can be obtained by means of an oxy-cyanogen flame. Cyanogen gas, however, is a deadly poison and is exorbitantly expensive, and in any case the temperature obtained with the use thereof is below 9,000° F. which is still a serious limitation for many desired flame heating uses.

Arc type heating torches were developed many years ago, and while arc devices frequently provide a solution to a commercial heating problem, they have not generally solved the problem of providing satisfactory flame heating means for those applications where flames are desirable. This is a natural limitation of the electric arc itself. The arc normally exists between electrodes and does not easily extend forward in the form of a stream, such as a flame does. Many devices have been proposed for overcoming this limitation of the electric arc. As an example, it has been proposed to extend the arc stream away from the arc electrodes by means of a superimposed magnetic field, with the objective of using the extended arc stream as a "flame" for heating purposes. Such devices have generally not proved satisfactory. One of the reasons for the unsatisfactory operation of such devices is that the arc stream is in no sense an electrically neutral flame, so that the substance being heated by such a stream tends to either become involved in the electric circuit or interfere with such electric circuit. As an example, if such an arc stream is used to heat a metallic substance, then the metallic substance tends to form part of the arc circuit, with the result that the arc short circuits through the metallic substance with the resultant disruption of the natural arc resistance. The result is arcing to the metallic substance with a tendecy to overheat and burn the metallic substance at the points of contact with the arc stream. The arc is therefore made unstable, and the substance is not heated evenly as by a flame. If, for instance, a non-metallic, non-conducting material is introduced into such an arc stream, it tends to interfere with the conductivity of the arc stream, so as to reduce the heating effect by reduction in the flow of electric current, and, in some cases it may even quench the arc.

Recently it has been proposed that these objections and limitations of prior flame heating apparatuses be overcome by the production of hot plasma, which is a state of material now recognized to be at a higher energy state (having a higher energy content per unit of mass) than the gaseous state of matter. While devices which use plasma flames have been developed in scientific laboratories, no commercially practical devices for using plasma flames for heating purposes have been developed. The laboratory devices thus far known have been subject to the limitation of inefficiency as measured by the relation between the power input and the effective heating output of a plasma flame, due in many cases to excessive losses of heat in the apparatus. Such laboratory devices have also been subject to the serious limitation of high cost operation, resulting from the fact that electrodes are frequently consumed at a relatively high rate. A high rate of electrode consumption also introduces the objection of contamination of the plasma with electrode material. A further common limitation of such laboratory devices has also been that they often produce plasma surrounded by and mixed with a high percentage of material in a non-plasma gaseous state. Such devices for instance sometimes produce a plasma stream in the center of a stream of other gas or liquid. This does not produce a flame which is suitable for many heating purposes, however, due to the fact that the surrounding gas cools the work which is being heated.

It has also been found to be a serious limitation of some such laboratory devices that they will not operate with a stable arc, unless the plasma stream is discharged into a vacuum chamber which is continually exhausted to a pressure materially below atmospheric. A frequent limitation of such equipment is that the nozzle through which the plasma emerges can be used for only one or two runs and then must be replaced. It is a further limitation of such equipment that the increase in the nozzle bore, resulting from erosion and burning during operation, changes the performance of the equipment. This disadvantage can obviously not be corrected by frequent nozzle replacement. Another limitation of such previously known devices has frequently been that the plasma stream and associated arc are so unstable that the performance of the equipment is affected by the positioning of a model or other object in the stream for heating purposes, so that such positioning becomes a critical factor in the use of the equipment. Some such devices will operate satisfactorily only when water is used as an arc constricting and plasma forming material. This has many disadvantages, among which are the disadvantage of having a chemically active plasma flame; another is the disadvantage of producing an explosive gas mixture as a by-product of the plasma flame. This latter is a double disadvantage in the case where the flame discharges into a vacuum chamber, requiring that such chamber be vented against explosion. Another disadvantage of previously known equipment is that they have not been successful in providing stable operation with polyatomic gases as the plasma forming gas, exhausting at atmospheric or higher pressures.

One object of this invention is to overcome these and other disadvantages of previously known flame heating equipment. Another object of this invention is to provide a commercially practical plasma flame generator and method capable of producing higher flame temperatures than were previously commercially obtainable. Another object is to provide such a flame generator and method which uses "non-consumable" electrodes, the consumption of electrodes being so relatively slow that the apparatus may be used for long periods of time without the necessity of adjusting electrode position or replacing the same. Another object of this invention is to provide a plasma flame generator and method which operates with a stable arc and plasma flame when discharging to atmosphere or higher pressures or submerged in liquids, and the stability of which is not affected by the presence of the objects to be heated. Another object of this invention is to provide a plasma flame generator and method which will satisfactorily utilize many gases, including nitrogen and hydrogen, as plasma materials and which does not require water as an arc constricting medium, nor as a plasma material. Another object of this invention is to provide a plasma flame generator and method capable of delivering heat to an object to be heated with a high degree of thermal efficiency and at a high rate when compared with conventional flames, and which utilizes low cost electrical current as a power source and low cost gases as plasma materials.

These and other objects of this invention will become clear in connection with the following description.

Wherever the word "plasma" is used herein, it is intended to connote material in an energy state of particle activity above the gaseous state, at least a portion of the atoms of the material being stripped of one or more electrons which are also present in the free state.

The plasma flame generator in accordance with the invention has means defining a substantially enclosed chamber. A first electrode defines a nozzle outlet from said chamber and a second electrode extends into the chamber in spaced relationship to the first electrode. Means are provided for passing an arc-forming electric current between said electrodes and means are provided for passing a sheath of a plasma forming gas along the arc, between the arc and at least the initial portion of the inner wall of the nozzle outlet, through the outlet nozzle out of contact with the arc in the form of a free plasma stream, so that the sheath of gas between the arc and the inner wall of the nozzle outlet constricts the arc, causing the same to extend at least part way and preferably all the way down the interior of the nozzle.

By passing the plasma forming gas in the form of a sheath around the arc and between it and at least the initial portion of the inner wall of the nozzle outlet, to thereby constrict the arc and cause the same to extend at least part way down the interior of the nozzle, all of the difficulties previously encountered in connection with plasma flame generators are avoided and a commercially practical device is produced for the first time.

In accordance with a preferred embodiment of the invention, the second electrode is a rod-shaped electrode extending coaxially with, in spaced relationship to, the axis of the nozzle outlet. This second electrode preferably has a conically tapered tip with a flattened point and most preferably extends part way into the nozzle outlet.

The plasma forming gas sheath is preferably passed coaxially along at least a portion of the rod-shaped second electrode and over the conical tip into the nozzle outlet. The first electrode defining the nozzle outlet is preferably in the form of a thin elongated nozzle shell, which is water-cooled and which has a circular cross-section. The rod-shaped second electrode is also preferably water-cooled.

While the sheath of plasma forming gas passed around the arc and through the nozzle may be rotated, the same need not, and as a matter of fact preferably should not, have vortex flow characteristics, as was required in connection with the prior art experimental plasma flame generators. If the sheath of plasma forming gas was rotated in the form of a vortex, it would not efficiently constrict the arc and force the same down the nozzle. A vortex flow in the nozzle would produce a low pressure core and a high pressure outer peripheral zone which would spread the arc out and cause various operational difficulties.

In contrast to the prior art experimental plasma flame generators with swirl chambers in which conversion to plasma occurs, when operating in accordance with this invention using a sheath of plasma forming gas which constricts the arc and forces the same down the nozzle, the plasma forming gas for all practical purposes is not converted into a plasma until some point down the length of the nozzle.

The invention will be described in further detail and will be more fully understood by reference to certain specific embodiments shown in the accompanying drawings, in which:

Fig. 4–a is a diagrammatic vertical section of a further embodiment of a plasma flame generator in accordance with the invention having a nozzle provided with a protective gas shield;

Figure 1:
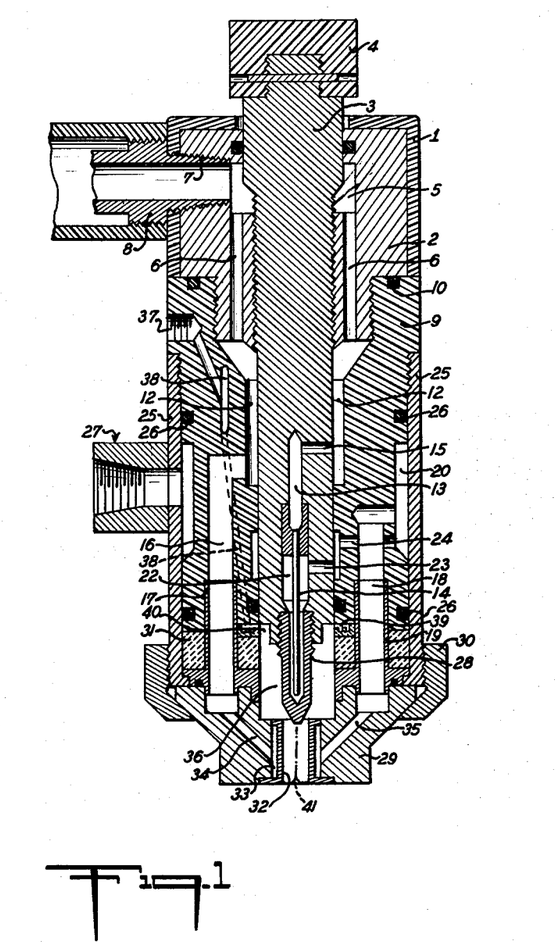
Fig. 1 is a vertical section of an embodiment of a plasma flame generator in accordance with the invention.

Referring to Fig. 1, 1 is a casing made of insulating material, as for example synthetic resin, such as polyethylene, nylon, or the like. This casing surrounds a body 2 of electrically conductive metal as, for example, copper, copper alloy, brass, aluminum, steel, or the like. Body 2 has a central female threaded bore into which the electrode holder 3 of conductive metal is screwed. The electrode holder 3 has an end adjusting cap 4 of suitable electrical insulating material as, for example, synthetic resin or the like. The body 2 also has the annular groove 5 in communication with the bores or conduits 6 and the threaded connection 7, into which the water-cooled current conductor or cable 8 is screwed. Screwed on to the conductive body 2 is the body 9 of insulating material as, for example, synthetic resin, such as polyethylene, nylon, or the like. The bodies 2 and 9 are sealed to each other by means of the gasket seal 10. The insulating body 9 has a central bore 12 of larger diameter than the electrode holder 3, which surrounds the electrode holder and is flared outwardly at its upper end in flow communication with the bores 6. The electrode holder 3 has at its lower end a central bore or passage 13 in communication with the thin hollow tube 14. The bore 12 is also in communication with the passage 13 by means of the side bore 15. The lower end of the insulating body 9 is provided with the bore 16 in communication with the bore 12, and with a tube or pipe 17 provided as an extension of the bore 16. The lower end of the insulating body 9 is also provided with the bore 18 having the pipe 19 provided as an extension thereof. The bore 18 leads to an annular recess 20 in the insulating body 9. The bore 13 in the electrode holder 3 is widened at 22 around the tube 14 and provided with a passage-way 23—24 leading to the bore 18 and recess 20. A metallic pipe 25, preferably of copper, copper alloy, steel, or the like, is fitted around the insulating body 9 in the form of a casing and sealed thereto by means of the O-ring seals 26. The casing 25 is provided with the threaded nipple 27 for connection to a water-cooled electrical cable. The nipple 27 leads into the recess 20.

Screwed into the lower end of the electrode holder 3 is permanent electrode 28 constructed, for example, of tungsten or thoriated tungsten. The electrode 28 is hollow and its hollow interior is larger than the tube 14, so that the tube 14 extends down into the interior thereof, leaving annular space between the inner wall of the electrode 28 and the outer surface of tube 14. A nozzle body 29, preferably of the same metal as the casing 25, is secured to the casing by means of the flange 30. A disc 31, of a refractory material, such as aluminum oxide, is positioned between the nozzle body 29 and the insulating body 9. The disc 31 has openings for the pipes 17 and 19 and is provided with a central bore. The nozzle body 29 has the nozzle 32 fitted therein. This nozzle 32, of platinum, silver or preferably of copper, is soldered in fluid-type contact with the nozzle body, leaving the annular space 33 therebetween. The annular space 33 is connected on one side with the pipe 17 by means of the bore 34 and on the other side with the pipe 19 by means of the bore 35. The nozzle body and the refractory disc 31 define the enclosed chamber 36, into which the electrode 28 extends.

The insulating body 9 is provided with the female threaded connection 37 leading into the gas passage 38, which leads to annular gas distributing grooves 39, which in turn leads into the annular gas outlet space 40 surrounding the electrode 28.

In place of the annular gap formed by the gas distributing grooves leading into the space 40, a single enclosed groove may be provided into which the passage 38 leads. This groove may be connected to the space 40 by a multiple number of annularly positioned holes. These holes should preferably be positioned at an angle from the center of the axis of the electrode 28 so as to provide a controlled amount of swirl to the gas. The holes may thus be positioned at an angle of 10–30° from the axis of the nozzle 28. In all cases it is extremely important that an even gas distribution around the electrode be provided.

The end of the electrode 28 has a frusto-conical shape, i.e., a conical shape, the tip of which is flattened and extends partially into the nozzle 32, which is cylindrical in shape.

In operation water-cooled electrical cables are connected at 7 and 27. These cables are of conventional construction and consist of a metallic electrical conductor surrounded by an insulation covering provided with cooling water passages through which cooling water is forced. The cooling water from the water-cooled electrical cables 8 flows into the annular groove 5, through bores 6 and through the annular passage formed by bore 12. From the annular passage formed by bore 12 a part of the cooling water flows through the bore 15, bore 13 and tube 14 to the interior of the hollow electrode 28, cooling the same, and up through annular space around tube 14, out through the passages 23—24 into the bore 18, to the annular recess 20 and out through the water-cooled electrical cable connected at 27 to a suitable drain, or for recirculation. Another portion of the cooling water from the annular passage formed by bore 12 flows through the bore 16, pipe 17, bore 34, around the annular space 33, cooling nozzle 32 through the bore 35, pipe 19, bore 18, to the annular recess 20 and out through the water-cooled electrical cable with the other portion of the water.

A source of electrical current as, for example, from a conventional welding generator, is connected to the water-cooled cable 8. This current flows through the conductive body 2 to the electrode holder 3 and then to the electrode 28. The lead of opposite polarity or ground is connected at 27 and is in electrical communication with the nozzle 32 by means of the nozzle body 29 and casing 25.

With cooling water flowing through the water-cooled leads and the device in the manner previously described, and with a suitable source of current connected at 7 and 27, an arc may be struck between the nozzle 32 and electrode 28, either by screwing the electrode body 3 by means of the insulating cap 4 downwardly to initially strike the arc and by retracting the same by screwing in the reverse direction, or by providing an initial high-frequency source of alternating current connected at 7 and 27. After the arc is struck the same may be suitably adjusted by screwing the electrode holder 3. Prior to striking the arc a plasma forming fluid from a suitable pressure force is passed in at 37, passes through the passages 38—39 to the outlet 40 into the chamber 36. The plasma forming gas will flow along the electrode 28 over the frusto-conical tip of the electrode and through the nozzle. The plasma forming gas will form a sheath around the arc between it and the inner surface of the nozzle 32, constricting the arc and forcing the same through the nozzle, as is indicated at 41. The plasma forming gas will be converted in the nozzle to a free plasma and will leave the nozzle and pass out of contact with the arc as a free plasma stream, being projected from the nozzle. The plasma forming gas is passed into the chamber 36, preferably at a velocity and/or pressure sufficient so that the same will emerge from the nozzle 32 as a free plasma stream having a velocity of at least 5, and preferably of at least 50 feet per second, and most preferably of at least 500–1000 feet per second.

The sheath of the plasma forming gas around the arc cools the outer periphery of the arc, reducing the amount of ionization and hence increasing the electrical resistance of the outer periphery. This in turn causes more current to flow through the path of lesser resistance at the core of the arc, thus constricting the arc and increasing its temperature. The constriction of the arc is progressive, being greater at the inner end of the nozzle. By adjusting the proportion of the flow of gas to the flow of current, the arc can be made to spread gradually as it extends down the nozzle bore, so that the arc may be spread in contact with any desired point in the bore. The arc should preferably extend down a major portion of the nozzle before contact with the nozzle.

To produce the highest percentage of plasma in the emerging gas stream, the relative flow of gas and current should be adjusted so that the arc spreads just before it would emerge from the nozzle, as diagrammatically indicated in the drawings.

While, as shown, the electrode 28 extends partially into the bore of the nozzle 32, such construction while preferred is not absolutely necessary and the tip of the electrode 28 may be positioned at a distance away from the entrance of the nozzle 32. In such an embodiment it is preferable if the sheath of gas flows around that portion of the arc between the electrode tip and the entrance to the nozzle in addition to surrounding the arc in the nozzle proper.

It is preferable that direct current be used of such polarity that the electrode 28 is the electron emitter. Current of any polarity or alternating current may, however, be used. It has been found, however, that by using the electrode 28 as the electron emitter a minimum of electrode consumption occurs, a more stable and properly positioned arc is obtained, and a much longer life and satisfactory operation is achieved.

Figure 2:
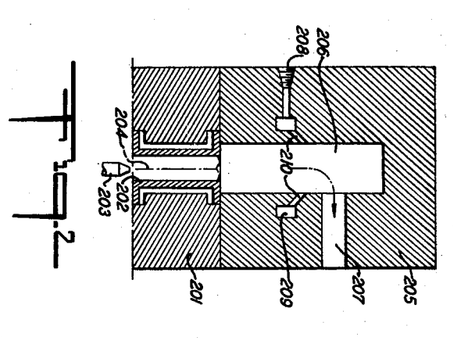
Fig. 2 is a diagrammatic vertical section showing an embodiment of an offset nozzle outlet construction for a plasma flame generator in accordance with the invention.
Figure 3:
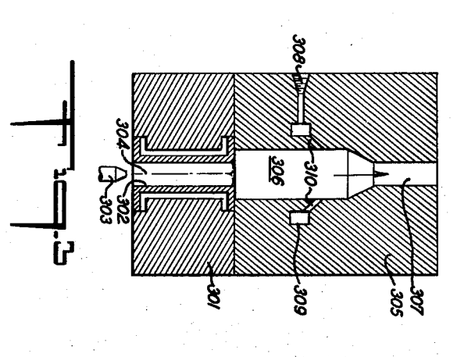
Fig. 3 is a diagrammatic vertical section showing a further embodiment of a nozzle outlet construction for a plasma flame generator in accordance with the invention.

Variations of the construction shown in Fig. 1 are shown in Figs. 2 and 3. In these two figures, 201 and 301 are intended to show the nozzle body portions corresponding to nozzle body 29 of Fig. 1. 202 and 302 are nozzles corresponding to nozzle 32 in Fig. 1. 203 and 303 represent the ends of electrodes corresponding to electrode 28 in Fig. 1. Indicated by dotted lines at 204 and 304 are the arcs extending down through nozzles 202 and 302 respectively, and spreading out and contacting said nozzles at their outer ends.

205 and 305 represent flame nozzle blocks. 205 has a central bore 206 and connecting therewith and at approximately right angles thereto, a flame nozzle bore 207. Nozzle block 305 has a bore 306 and approximately concentric thereto is a smaller flame nozzle bore 307. The bore 307 may also be of a different shape as, for example, ribbon-shaped in order to produce a plasma stream of a desired cross-sectional shape. The bore 307 may also be dimensioned to provide a higher or lower velocity of the plasma stream.

The operation of these two alternative embodiments is essentially the same as previously described in connection with Fig. 1, except that the hot plasma emerging from electrode nozzles 202 and 302 respectively, instead of discharging from the apparatus, enters a chamber composed of either the bore 206 or the bore 306 and from thence flows out of the apparatus through a flame nozzle bore 207 or 307. Flame nozzle blocks 205 and 305 may be gas, such as air-cooled or water-cooled in accordance with known means.

The purpose of the constricted flame bore as illustrated by either 207 or 307 is to cause a stronger flame jet with additional velocity and also to direct such flame jet in a desired direction. Flame nozzle bores 207 and 307 may be provided at any other desired angles than those shown, if desired to accomplish this latter purpose.

The embodiments as shown in Figs. 2 and 3 may also be used for introducing a secondary gas into the free plasma stream in order to reduce the outlet temperature with a cheap gas, such as air or the like; to provide the possibility of using heating gases which might contaminate or erode the electrodes; to increase the velocity of the heating gas emerging from the nozzle, or for any other desired purpose. In order to introduce such a secondary gas, passages 208 and 308 are provided in the blocks 205 and 305 respectively. The passage 208 terminates as an annular channel 209 from which nozzle outlets or annular outlet 210 leads into the bore 206. The secondary gas, such as air, is introduced at 208, flows into the annular channel 209 and out through the outlet 210 for mixture in the passage 206 with the free plasma stream. Due to the direction of the nozzle outlet 210 the velocity of the plasma stream may be increased. The conduit 208, annular passage 209 and nozzle 210, may, in place of or in addition to, be positioned leading into the passage 207.

In the embodiment of Fig. 3 passage 308 leads into the annular channel 309, to which is connected annular nozzle or nozzles 310 leading into the bore 306. Additionally or alternatively 308, 309 and 310 may be in communication with the bore 307.

Figure 4:
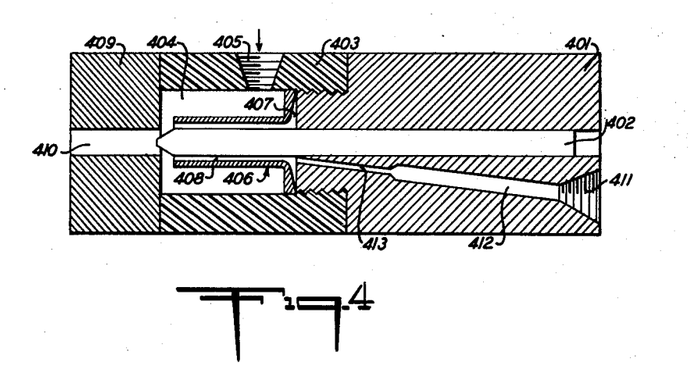
Fig. 4 is a diagrammatic vertical section of a further embodiment of a plasma flame generator in accordance with the invention.

A still further embodiment of this invention is shown in connection with Fig. 4, which illustrates a further embodiment of a plasma generator in accordance with this invention. It has sometimes been found economical to use air, or at least a mixture containing part air, as a plasma forming gas. Air has been found quite satisfactory for applications of this kind, as a plasma forming gas, but it is subject to the disadvantage that its use causes excessive oxidation and erosion of the electrodes, particularly of the electron emitting electrode where direct current is used.

In accordance with this embodiment of the invention, a small amount of a relatively inert gas is used to surround an electron emitting arc electrode, while a relatively larger amount of more reactive gas is introduced and passes with said inert gas through the arc stream, a plasma stream being formed from at least some of said more reactive and at least some of said inert gas; said inert gas forming a gas envelope surrounding and protecting said emitting electrode.

It is usually most convenient to facilitate the maintenance of the inert gas envelope by introducing a mechanical shield, such as a metal or ceramic shield between the inert gas surrounding the electrode and the more reactive gas such as air. However, such shield is not necessary if a sufficiently strong stream of inert gas is used.

The plasma generating assembly in accordance with this embodiment of the invention is indicated in Fig. 4, in which body 401 has mounted therein an electron emitting electrode 402. Threadably mounted on 401 is insulating sleeve 403, which defines the outer cylindrical surface of air space 404. Threaded hole 405 is provided in sleeve 403 for connecting to a source of compressed air (not shown). Mounted on the inside end of body 401 is flanged tube 406, the flange of which is slightly conically shaped, so as to provide gas space 407 between said flange and the end of body 401. The central body of tube 406 is slightly larger than the electrode 402, so as to provide annular, cylindrical gas space 408. Nozzle 409 is permanently mounted on the end of sleeve 403 and is provided with nozzle hole 410, concentric with electrode 402. Threaded hole 411 is provided in body 401 for connection to a source of relatively inert gas, such as $N_2$, under pressure (not shown). In body 401, communicating with hole 411, is conduit 412, which in turn communicates with extended conduit 413, which discharges into space 407.

In operation the leads from an electric current source suitable for providing a high amperage, direct current, such as a welding generator (not shown), are connected by means (not shown) to electrode 402 and nozzle 409. An arc is struck between electrode 402 and the area of nozzle 409 adjacent the inner end of hole 410 by means previously described. A relatively inert gas, such as nitrogen or argon, is introduced under pressure from a source (not shown) into hole 411, whence it flows through conduits 412 and 413, into gas space 407, and through cylindrical gas space 408, where it shields the electrode 402, and from which it emerges in the form of a conical stream surrounding and shielding the point of electrode 402. Compressed air from a source (not shown) is introduced into hole 405, from which it enters space 404 and passes together with the more inert gas through nozzle 410, forming a sheath around the arc between the arc and nozzle wall, where the combined gases are converted, at least in part, into a free plasma stream, passing out of the nozzle and out of contact with the arc.

Figure 4A:
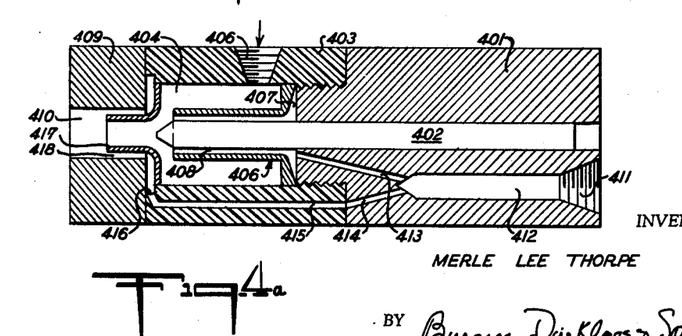

In addition to protecting the central electrode, such as the electrode 402, with a protective sheath of a relatively inert gas, it is also possible to additionally or alternately protect the nozzle electrode by such an inert gas sheath. Such an embodiment is shown in Fig. 4a. The structure and operation is identical with that described in connection with Fig. 4 except that the conduit 412 for the inert gas, in addition to leading into the conduit 413, is also connected to an additional branch conduit 414, which is in flow communication with the conduit or bore 415 extending through the sleeve 403. This conduit 415 terminates at an annular groove 416. A funnel-shaped sleeve or flange similar in construction to the shield 406 is positioned in spaced relation to the nozzle wall, forming the annular space 418 between it and the nozzle wall.

In operation the relatively inert gas passed in through hole 411 which flows through conduits 412 and 413 additionally flows through the conduits 414 and 415 and will be passed through the annular space 418 between the well cooled shield 417 and inner surface of the nozzle 409, forming a protective sheath of this inert gas between the nozzle wall and the more reactive gas sheath containing the gas passed in through 405. The arc will strike in the nozzle 409 past the shield 417, this area being shielded with inert gas.

It must be understood in connection with the foregoing embodiments of this invention that the principle involved is the use of a more inert gas to shield the electrode and nozzle from the chemical action of a less inert gas. For instance, a noble gas, argon, could be used to shield an iron electrode from a more reactive gas, nitrogen, which would otherwise nitride the iron. As another example, a gas, nitrogen, could be used in conjunction with a tungsten electrode with a more reactive gas, air, to prevent oxidation of the electrode.

Figure 5:
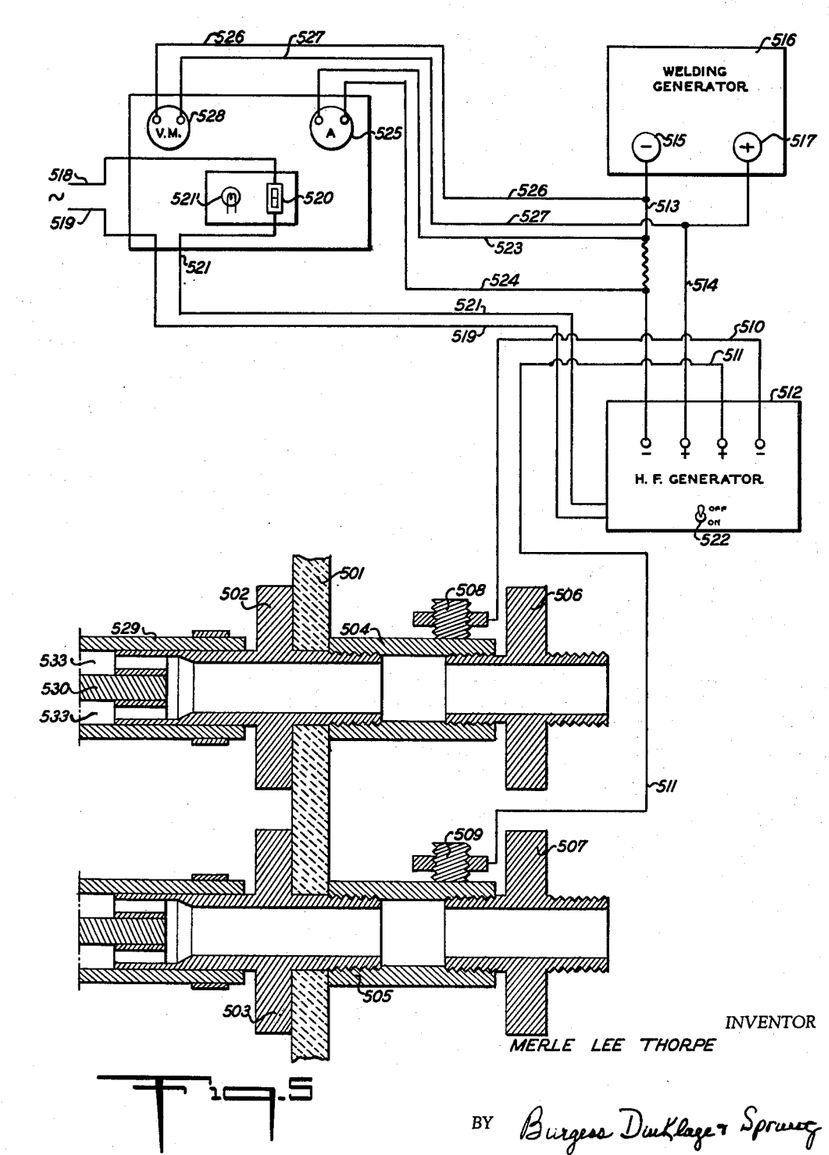
Fig. 5 is a schematic wiring diagram for power source for the plasma flame generator in accordance with the invention.

A practical method of connecting up a power source for use in conjunction with this invention is illustrated by the wiring diagram of Fig. 5. This diagram shows schematically the connections from conventional power sources to connectors for water-cooled electrical leads which may be used for flexibly connecting the power source to the heat-fusible material spray gun by means of electrical cables which supply both current and cooling water to the apparatus. The use of such cooled cables also reduces the cross-sectional area of copper (or other conducting material) required for such cables, hence reduces their weight and increases their flexibility.

Referring to Fig. 5, 501 is an insulating mounting panel, upon which are mounted hollow conductor threaded connections 502 and 503. These in turn are threaded into tubes 504 and 505 respectively; said tubes having their ends threaded and mounted with hollow hose connectors 506 and 507 respectively. Mounted on the sides of tubes 504 and 505 are current lead connectors or taps 508 and 509 respectively.

In operation a water hose from a source of water under pressure (not shown) is connected to hose fitting 506. Water flows through this fitting through the tube 504, cable connections 502 and through the cable insulator 529, in which the bare electric cable 530 extends. The insulating sheath 529 of the cable has a multiple number of tubular water passages 533 annularly positioned around the bare electric cable or wire 530. The cooling water flows through these passages 533 and cools the cable 530. The cable 530 is directly connected in electrical contact with the connection 502. From the interior of the insulating sheath 529 the cooling water flows through the spray gun as, for example, of the type illustrated in the previous embodiments, such as in the embodiment of Fig. 3, and back through the interior of the insulating sheath 531, through the connector 503, tube 505 and hose connector 507, to a hose (not shown) connected thereto leading to a drain or cooler for recirculation. The sheath 531 is identical in construction to 529 and has in the interior thereof the bare electric conducting cable 532 and passage 533. Cable 532 is conductively connected to the threaded connection 503. Electric current may thus flow from the tap 508 through the tube 504 and connector 502 to the cable 530 and from the cable 532 through the connector 503 and tube 505 to the tap 509.

Conductors 510 and 511 connect to a standard commercial, high frequency generator indicated by box 512. Heavy conductors forming internal connections in said generator connect between 510 and 511 to conductors 513 and 514 respectively. Conductor 513 connects to the negative connector 515 of a standard welding generator indicated by the box 516; and 514 connects to the positive connector 517 of said generator. A low resistor 532 is interposed in lead 513 as a current measuring shunt for ammeter 525.

A source of power (not shown), such as a gasoline engine or an electric motor, is used to operate the welding generator in a conventional manner.

A separate source of power, such as a 110 volt, 60 cycle, alternating current source (not shown) is connected to leads 518 and 519. Lead 518 is connected to a manually operated switch 520, which if desired may be equipped with a pilot light 521' indicating when the switch is on. The other terminal of switch 520 is connected to lead 521. Leads 519 and 521 connect to the high frequency generator 513 which comprises a transformer (not shown), the primary of which is connected to leads 519 and 521, 519 being connected through switch 522. The secondary of said transformer is connected to an oscillator circuit and coupling coil, which induces a high voltage, high frequency current in lead 510, the lead 511 being at ground potential.

Ammeter leads 523 and 524 are connected to conductor 513 on either side of resistor 532 and to ammeter 525. Volt meter leads 526 and 527 are connected respectively to conductors 513 and 514 and to volt meters 528.

In operation the conventional welding generator 516 is started and supplies welding voltage through leads 513 and 514 and through high frequency generator 512 to leads 510 and 511 and thence to the water-cooled cables, as previously described. When switches 522 and 520 are turned on, current flows through leads 521 and 519 to the oscillator circuit of the high frequency generator 512, causing a high voltage to be imposed onto leads 510 and 511, such voltage being sufficient to form an electric spark which forms an initial conducting path sufficient to ignite the arc, which subsequently is maintained by the main arc current from generator 516. An operator can tell by the reading of volt meter 528 that the generator is in operation, and by the reading of ammeter 525 when the arc is struck, since no current will flow until the arc is ignited. The operator may stop the flow of high voltage current imposed by high frequency generator 512 by opening switch 520.

Almost any material in gaseous or in liquid form may be used as fluid for feeding into the apparatuses described in conjunction with this invention as the plasma-forming fluid. Wherever the term plasma gas, plasma-forming gas, or similar expression has been used, it is intended to also include the gas of a liquid initially fed into the device, it being understood that such liquid would first be vaporized to form a gas before additional energy would further convert the gas into a plasma. It is obvious that if it is desired to use a material which would normally be either in solid or liquid state at room temperature for a plasma-forming material, that such material can be preheated to convert it to a gaseous state prior to its conversion by the arc stream into a plasma.

Plasma-forming materials should be selected on the basis of the desired properties which they acquire when converted to plasma. A first required property of the plasma is its property of efficiently transferring heat to the material to be heated. Some materials in plasma form transfer heat more readily than others. Another property which may be desirable is a property of being able to store heat in the plasma. This property is measured in terms of, for instance, calories per gram per degree C. temperature change. It is obvious that a plasma with a high storage capacity for heat can transfer more heat with a lesser drop in temperature. Other properties of the plasma produced which are important to the heating operation are the "chemical properties" or "physical interaction properties" of the plasma with respect to the material being heated. The properties of "chemical properties" and "physical interaction properties" have been intentionally grouped together here as a single generic description for the action of a plasma on another material (such as the material being sprayed) which will produce in said material an ultimate chemical change. The reason for referring to these two kinds of action in connection with an ultimate chemical change is required by the fact that there is no clear line of demarcation, in modern scientific terminology, between "chemical action" and "physical action" in the range where hot plasmas are most active. It is not important for purposes of this description, what the actions are called. As a practical matter there may be a chemical change of the heated material as the result of the action of the plasma upon it. For purposes of simplicity, the actions, both chemical and physical, referred to above will hereinafter be referred to as "chemical action" of the plasma.

For most cases it is desirable to limit the chemical action of the plasma on the heated material to a minimum. For this purpose gases which are relatively inert have been found to be satisfactory plasma materials. For most materials relatively inert gases suitable for producing plasma are, for instance, argon, helium, hydrogen, nitrogen or mixtures thereof. Of these gases nitrogen has been found most suitable for most use, due to the fact that it is sufficiently inert, has a high rate of heat transfer, high arc voltage, and has an exceptionally high heat capacity. Contrary to results predicted by current theory, it was found that nitrogen did not require as high an arc voltage as hydrogen for efficient conversion to plasma. It was also found that nitrogen responds better than helium and argon to the thermal pinch effect, which forces the arc stream into a narrow channel, as previously described. For instance, open arc shapes testing these gases under the same conditions with a $3/32$ inch rod for one electrode and a flat plate for the other electrode, showed the following widths of arc streams when the arc was surrounded by the gas listed:

| | Inches |
|---|---|
| Argon | ¼ |
| Helium | 3/16 |
| Nitrogen | 1/16 |
| Hydrogen | 1/16 |

Argon is easily ionized at a low energy level of 75 watts per cubic foot, while nitrogen requires over 450 watts per cubic foot. Helium requires about 100 watts per cubic foot. A small nitrogen or hydrogen arc stream has been found to be the most suitable for directing an arc through a nozzle forming one of the electrodes without prematurely striking the nozzle walls.

Where chemical action is desired between the plasma and the material being heated, then the plasma material may be selected with this objective. As an example, if it is desired to produce metal oxides from metal, a plasma gas of oxygen or air may be used. As a further example, if it is desired to produce metal particles which combine oxides and carbides, a mixture of oxygen and a carbonaceous gas may be used or a gas containing both carbon and oxygen, such as carbon dioxide.

If desired, mixtures of various gases (or other materials) may be used as the plasma-forming mataerial for operational reasons, rather than chemical action reasons. For instance, a mixture of hydrogen and argon has been successfully operated for reducing the arc voltage required by the use of pure hydrogen. The arc voltages required of the preferred gases in commercially pure form when each is used in the same nozzle having a 3/16" bore and ¾" length, are as follows: hydrogen, 105 volts; nitrogen, 55 volts; argon, 28 volts, helium 36 volts; and air 90 volts.

Another unexpected result found when using the diatomic gas, nitrogen, was the decrease in the percentage of heat lost through the nozzle walls, with increase in concentration of nitrogen.

Table I below gives the calculated plasma temperatures obtainable with various gases and the approximate heat content of the plasma.

TABLE I

| Gas | Plasma Temperature, Degrees Fahrenheit | Heat Content of Plasma, Watts Per Cubic Foot Gas (at Standard Conditions) at 10-20% ionization |
|---|---|---|
| A | 18,000 | 75 |
| He | 27,000 | 110 |
| $H_2$ | 15,000 | 260 |
| $N_2$ | 16,000 | 425 |
| CO | 8,500 | 65 |

Table II lists the minimum gas flow for various nozzle proportions, the current required for an 8,500 degree F. flame temperature at minimum gas flow, the maximum current before causing uncooled electrode spitting and electrode diameter.

TABLE II

| Nozzle Diam., inches | Approx. Nozzle Length, inches | Min. Gas Flow, C.F.H. | Amps. to Give 8500° F. Flame Temp. at Minimum Gas Flow | Max. Amps. Before Causing Electrode Spitting | Electrode Diameter, inches |
|---|---|---|---|---|---|
| ⅛ | ¼–½ | 20 | 42 | 110 | ⅛ |
| 3/16 | ½ | 52 | 120 | 247 | 3/16 |
| ¼ | ½ | 92 | 362 | 439 | ¼ |

Table III gives the plasma jet velocity as it emerges from the nozzle, together with other operating information for different nozzle sizes.

TABLE III

| Nozzle Diam., Inches | Flame Length, Inches | Plasma Jet Velocity, Feet Per Second | Temp., Degrees F. | Heat to Gas, percent | Direct Current, Volts | Amperes | Flow Plasma Gas, Cubic Feet per Hour (Measured at Standard Conditions) | Cooling Water Flow, Gallons per Minute (Input Water Temp. of Approx. 60° F.) |
|---|---|---|---|---|---|---|---|---|
| 3/16 | 4 | 1,500 | 8,500 | 60 | 55 | 155 | 40 $N_2$ | 2 |
| ¼ | 4–6 | 1,500 | 8,500 | 60 | 55 | 310 | 80 $N_2$ | 3 |
| 9/32 | 4–6 | 1,000 | 19,000 | 70 | 75 | 720 | 80 $N_2$ | 5 |
| 7/32 | 10–15 | 3,500 | 7,000 | 80 | 150 | 400 | 250 $H_2$ | 5 |
| 9/32 | 10–15 | 2,000 | 19,000 | 72 | 120 | 500 | 70 $N_2$ / 10 $H_2$ | 5 |
| ⅛ | 2–3 | 2,000 | 16,000 | 75 | 150 | 400 | 120 $H_2$ | 5 |
| 3/16 | 1–3 | 3,000 | 22,000 | 50 | 30 | 800 | 100 A | 7 |
| 3/16 | 1–3 | 3,000 | 29,000 | 55 | 40 | 800 | 100 He | 7 |
| 3/16 | 3–5 | 2,000 | 9,500 | 65 | 65 | 500 | 70 $N_2$ | 5 |

Most of the materials of construction for the apparatuses described herein will be easily selected by those skilled in the art since the requirements of these materials may be clearly understood in connection with this description. It is obvious, for instance, that electrical insulating material must be used to separate electrode elements so as to avoid short circuits; and it is equally obvious that electrical conducting materials must be used for those parts which are intended to carry current to the electrodes.

In accordance with this invention, it has been found particularly desirable to us thoriated tungsten, which comprises tungsten alloys of from 1 to 2% thorium and the balance substantially tungsten as the electron emitter electrode (cathode). Where direct current is used, the anode electrode may be made of a base material, such as copper, providing that it is made in the form of a thin shell and adequately water-cooled, such as is illustrated for instance as nozzle 32 of Fig. 1. When using thoriated tungsten electrode emitter and water-cooled electrode nozzle, both electrodes become relatively long lived. When operated normally, the water-cooled electrode nozzle will last indefinitely. Tests have shown that the thoriated tungsten emitter electrode has an erosion rate as low as .020" in twenty hours of operation when using a 400 ampere current and 40 cubic feet per hour of nitrogen as the plasma gas with a 3/16" diameter nozzle.

The dimensional proportions of the plasma generating emitter electrode and nozzle electrode have been found important to efficient performance. Preferably the outside diameter of the emitter electrode (such as is illustrated for instance at 28 in Fig. 1) is made larger than the bore of the nozzle electrode (which is illustrated, for instance, as 32 in Fig. 1). Furthermore, it is desirable that the length of the nozzle electrode bore to the diameter of said bore be greater than two to one and preferably not less than three to one, but most preferably not more than fifteen to one.

In the preferred embodiment of this invention, the emitter electrode has a pointed tip, such as a conical shape with, for instance, an included angle of approximately between 40° and 120°. It has been found desirable to blunt the point of the conical electrode and somewhat, so that the same has a flattened point and the electrode tip will have an over-all frusto-conical shape. The flattened point of the electrode may, for example, be of a size between about 1/32 and 1/4" in diameter, and preferably 1/16 to 3/16" in diameter. In connection with a 3/8" electrode used with a 7/32" nozzle at 400 amps. current and with a plasma gas of 60 cubic feet per hour of nitrogen, a 1/8" diameter flattened tip is preferred. In general, the diameter of the flattened portion of the tip of the electrode should increase with the amperage. Thus for example with the same electrode and nozzle size as given above, and with the same rate of nitrogen flow, a current of 700 amps. should preferably have a 1/4" diameter flattened tip, and if current is increased to up to about 2000 amps., a 1/2" or larger diameter flattened tip is preferred. In the preferred embodiment of this invention, the emitter electrode is located centrally with, and close to, the bore in the other electrode and most preferably so that the shortest distance from the emitter electrode to the other electrode is not more than twice the diameter of the bore of said other electrode and most preferably a distance of between one quarter the diameter of said bore and the diameter of said bore.

These electrode proportions and positions are important to the efficient and stable operation of the apparatus. It is generally desirable for such apparatus to convert as much as possible of the plasma gas flowing through the apparatus into actual plasma. This avoids waste of gas and also avoids the detrimental cooling effect of gas below plasma temperature. Proportioning of the position of the emitter electrode to the electrode nozzle and proportioning of the diameter length ratio of said nozzle are important to this result. The gas flowing down through the nozzle constricts the arc stream, as was previously discussed, but it is important that this constricting effect diminish toward the end of the nozzle so that (a) practically all of the gas is heated by the arc stream to plasma condition, and (b) the arc stream widens and spreads at the end of the nozzle bore to make contact at the end of said bore or on the outer nozzle surface adjacent said bore. The advantage of the preferred construction in accordance with this invention is that these objectives are achieved and substantially all of the gas emerging from the nozzle orifice is a free plasma stream. To achieve these objectives, it is not necessary that the bore of the electrode nozzle be cylindrical, and in fact it is sometimes desirable to have the bore tapered or conical, or tapered with a gradual change in conical angle, so that the bore is curved somewhat. Where it is desired to impart relatively high velocity to the emerging plasma stream, it is sometimes desirable to taper the bore so that the outlet end is smaller than the inlet end. This would be done in the case where the small restriction at the outlet end required to produce the desired velocity is too small for the inlet end, in that short circuiting arcing might occur at the inlet end if the bore were made this small. In other cases it may be desirable to taper the electrode nozzle bore in the opposite direction, so that the largest bore is at the outlet end. This would be done in cases where the flow of gas is sufficiently low so that the constricted arc stream widens considerably as it flows down through the bore. By widening the nozzle bore it is also possible to keep the walls of the nozzle bore sufficiently far from the widened arc stream to prevent premature arcing and short circuiting thereto.

A stable arc results from this construction because of the natural regulatory effect of its operation.

Figure 6:
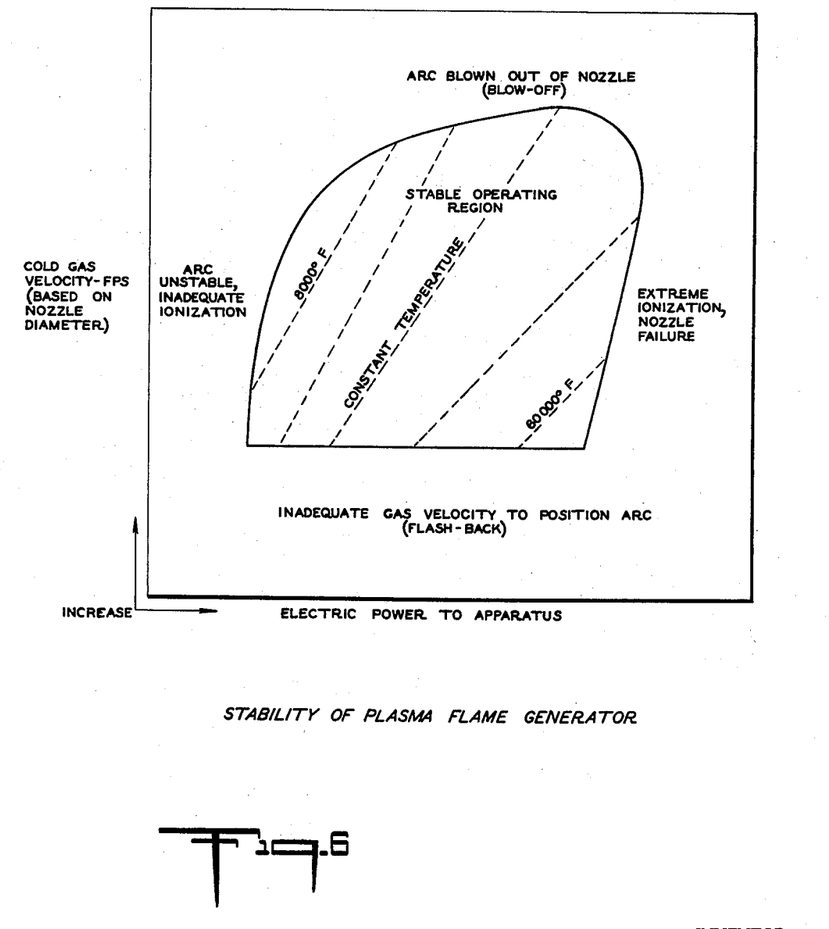
Fig. 6 is a typical schematic stability diagram for an arc of a plasma flame generator in accordance with the invention.

The self-regulatory stable operating characteristics of the heating arc of the apparatus in accordance with this invention are shown diagrammatically in Fig. 6.

As may be seen from Fig. 6 there is a certain minimum gas velocity required for operation. At velocities below this minimum velocity which may be very easily empirically determined, flash-back will occur. Furthermore, there is a certain minimum electric power requirement at the lowest operable gas velocity below which the arc will be unstable and sufficient ionization will not occur. There is also a maximum gas velocity which increases somewhat with increasing electric power. If this maximum is exceeded, the arc will be blown out. The upper limit of the electric power supplied is merely determined by the structural limitations of the apparatus, and for any given piece of equipment after a certain power is reached, failure will occur. This failure generally consists in a melting, puncturing or pitting of the nozzle by the arc. There is, however, an extremely wide area of stable operation between these limits, as is indicated by the enclosed portion of the graph shown in Fig. 6.

For the proper operation of an apparatus in accordance with this invention, such as for instance is illustrated in conjunction with Fig. 1, it is important that the flow of plasma gas be properly coordinated with the flow of electric current to the arc. If the gas is not turned on at all and the arc struck at high amperage to the inner end of the nozzle, such inner end will become rapidly pitted and gouged. It is usually advisable therefore to start the plasma gas flowing before igniting the arc and then to only ignite the arc at low amperage; thereafter gradually increasing the current input to the arc. It is sometimes advisable to arrange to perform these functions automatically, using known automation expedients, to avoid damage to the equipment, which might result from the failure of the operator to adjust the gases and current flow properly.

Both the electric arc stream and the random plasma stream emit ultra-violet and infra-red frequency radiation. It is therefore advisable for operators in the vicinity of the apparatus to use adequate eye protection.

The following examples are given by way of illustration and not of limitation:

Example 1

A flame heating apparatus, such as is illustrated in Fig. 1, having the following dimensions:

| | |
|---|---|
| Diameter of electrode 28 inches | 0.375 |
| Included angle of conical electrode tip degrees | 40 |
| Diameter of flattened end of electrode tip inches | ¼ |
| Diameter of chamber 36 do | ¾ |
| Length of chamber 36 do | 1 |
| Diameter of nozzle 32 do | 7/32 |
| Length of nozzle 32 do | 1⅛ | is connected up to a 600 ampere conventional direct current welding generator through water-cooled electrical leads which are also used to supply cooling water. 30 lbs. per minute cooling water from an ordinary city water supply at approximately 65° F. and 60 p.s.i.g. is supplied at the inlet end of one of the water-cooled cables, the other cable being connected to a discharge drain.

A conventional high frequency arc igniter is connected across the electrical leads from the generator, so that a high frequency igniting current can be imposed on the electrode by the operator for ignition purposes by closing of the switch on the high frequency generator.

Nitrogen is used for a plasma gas in this case and is supplied from a bottled source through a conventional pressure reducing regulator, thence through a conventional flow meter, and then conveyed by rubber hose to the gas inlet of the apparatus. A needle valve is included in the gas line for adjusting the flow of gas.

The pressure regulator on the nitrogen bottle is set at 50 pounds per square inch and the needle valve adjusted to produce an initial flow of 80 cubic feet per hour (measured at standard conditions). The arc is struck by first setting the welding generator to an open circuit voltage setting of 110 and a current setting of 100 at 55 volts, and then turning on the switch of the high frequency generator. Immediately after the arc is struck, the switch on the high frequency generator is turned off again.

The flow of nitrogen is reduced from the initial flow to a final flow of 40 cubic feet per hour; and then simultaneously the flow of current is increased from its initial setting to a final setting of 55 volts and 500 amperes.

An intensely hot plasma flame with a temperature of approximately 16,500° F. emerges from the nozzle of the apparatus.

Example 2

Example 1 is repeated, using the plasma forming fluids, pressures, flow rates, voltages and amps. as indicated in the following table and flame temperatures as indicated in the table are obtained:

TABLE

| Plasma Forming Fluid | Pressure | Flow Rate | Volts | Amps. | Temperature |
|---|---|---|---|---|---|
| $N_2$ | 50 | 60 | 65 | 700 | 17,500 |
| A | 50 | 100 | 30 | 800 | 22,000 |
| He | 50 | 100 | 40 | 800 | 29,000 |
| $N_2$ | 50 | 45 | 110 | 550 | 24,000 |
| $H_2$ | 100 | 120 | 150 | 400 | 16,000 |
| $N_2$ / $H_2$ | 50 | 70 / 10 | 120 | 500 | 19,000 |
| Air | 50 | 100 | 100 | 700 | 18,000 |
| $CO_2$ | 50 | 100 | 85 | 500 | 15,000 |
| CO | 50 | 100 | 85 | 500 | 15,000 |
| $NH_3$ | 50 | 100 | 120 | 500 | 16,000 |
| $C_3H_8$ | 50 | 100 | 140 | 500 | 16,000 |
| $CH_4$ | 50 | 100 | 140 | 500 | 16,000 |
| $O_2$ | 50 | 100 | 80 | 500 | 13,500 |

Example 3

A plasma flame generator is provided, connected up for operation, and operated exactly as described above in Example 1.

When the plasma flame emerges from the apparatus, the flame is directed at a distance of about 3″ from the nozzle of the apparatus, against the surface of an aluminum oxide aggregate (a refractory ceramic material). After a few seconds the ceramic material is melted by the plasma flame and the flame melts or cuts a path through the ceramic material where such flame is directed upon it.

The foregoing specific description is for purposes of illustration and not of limitation and it is therefore my intention that the invention be limited only by the appended claims or their equivalents wherein I have endeavored to claim broadly all inherent novelty.

I claim:

1. A plasma flame generator comprising means defining a substantially enclosed chamber, a first electrode defining a nozzle outlet from said chamber, a second electrode extending into said chamber in spaced relationship to said first electrode, means for passing an arc forming electric current between said electrodes, and means for passing a sheath of a plasma forming gas along the arc between it and at least the initial portion of the inner wall of the nozzle outlet and through and out of said nozzle, out of contact with the arc, in the form of a free plasma stream, said sheath of gas constricting the arc causing the same to extend at least part way down the interior of the nozzle.

2. A plasma flame generator according to claim 1 in which said second electrode is a rod-shaped electrode coaxially positioned with respect to said first electrode.

3. A plasma flame generator according to claim 2 in which at least one of said electrodes is a water-cooled electrode.

4. A plasma flame generator according to claim 3 in which both of said electrodes are water-cooled electrodes.

5. A plasma flame generator according to claim 4 in which said rod-shaped electrode is a hollow water-cooled electrode and in which said first electrode is a thin water-cooled elongated nozzle-shaped electrode of substantially circular cross-sectional shape.

6. A plasma flame generator according to claim 5 in which said second electrode is a thoriated tungsten electron emitter electrode.

7. A plasma flame generator according to claim 6 in which said second electrode has a conical tip with an included angle of between about 20 and 120 degrees and a flattened point.

8. A plasma flame generator according to claim 7 in which the first electrode has a ratio of length to bore diameter of more than 2:1.

9. A plasma flame generator according to claim 8 in which the first electrode has a ratio of length to bore diameter of between 2:1 and 15:1.

10. A plasma flame generator according to claim 9 in which said means for passing a sheath of plasma forming gas is means for passing a sheath of plasma forming gas along the arc between it and the major portion of the inner wall of the nozzle outlet.

11. A plasma flame generator according to claim 10 in which said means for passing a sheath of plasma forming gas is means for passing a sheath of plasma forming gas along the arc between it and substantially the entire inner wall of the nozzle outlet whereby the arc is constricted and extended down the entire interior of the nozzle striking at the outer end of the nozzle.

12. A plasma flame generator according to claim 1 in which said first electrode is an elongated nozzle-shaped electrode having a ratio of length to bore diameter of more than 2:1, said second electrode is a rod-shaped electrode coaxially positioned with respect to said first electrode and in which said means for passing a sheath of plasma forming gas is means for passing a sheath of plasma forming gas along the arc between it and the major portion of the inner wall of the nozzle outlet.

13. A plasma flame generator according to claim 12 in which said second electrode has a conical tip with an included angle of between 20 and 120 degrees and a flattened point.

14. A plasma flame generator according to claim 13 including means for adjusting the distance between said first and second electrodes.

15. A plasma flame generator according to claim 1 including means for passing a sheath of a separate protective gas around at least one of said electrodes.

16. A plasma flame generator according to claim 15 in which said second electrode is a substantially rod-shaped electrode coaxially positioned with respect to said first electrode, and including a shield in said chamber surrounding at least a portion of said second electrode in spaced relationship thereto, and means for passing a substantially inert gas between said shield and said second electrode to thereby form a protective gas shield surrounding said second electrode.

17. A plasma flame generator according to claim 15 including a shield at least partially extending into said first electrode in spaced relationship thereto, and means for passing a substantially inert gas between said shield and said nozzle to thereby form a protective gas shield surrounding the inner wall of said first electrode.

18. A plasma flame generator according to claim 1 in which said first electrode is an elongated nozzle-shaped electrode having a ratio of length to bore diameter of more than 2:1, said second electrode is a rod-shaped electrode positioned coaxially therewith, and in which said means for passing a sheath of plasma forming gas is means for passing a plasma forming gas into said chamber for passing along at least a portion of the length of said rod-shaped electrode.

19. A plasma flame generator according to claim 18 in which said rod-shaped electrode has a conical tip with an included angle of between about 20 and 120 degrees and a flattened point.

20. A plasma flame generator according to claim 1 including a second chamber having an outlet opening positioned in front of said nozzle with said nozzle leading thereinto and including means for passing a fluid into said second chamber.

21. A plasma flame generator according to claim 20 in which the outlet opening of said second chamber extends at an angle to the axis of said nozzle.

22. A plasma flame generator according to claim 20 in which the outlet opening of said second chamber has a substantially smaller cross-sectional size than the cross-sectional size of said second chamber.

23. A plasma flame generator according to claim 1 in which said first electrode is a thin elongated water-cooled nozzle-shaped electrode having a substantially circular cross-section and a ratio of length to bore diameter of more than 2:1, said second electrode is a hollow water-cooled rod-shaped electrode coaxially positioned with respect to said first electrode and having a conical tip with an included angle of between 20 and 120 degrees and a flattened point, said chamber is a substantially cylindrical chamber surrounding said second electrode, said means for passing a sheath of plasma forming gas is means for passing gas into the portion of said chamber opposite said first electrode around said second electrode and including means for axially moving said second electrode to vary the distance between it and said first electrode.

24. Method for the generation of a plasma flame which comprises forming an electric arc in a confined zone by passing an arc forming electric current across a gap in said zone to a nozzle-shaped electrode, and passing a plasma forming gas into said zone and through said nozzle in the form of a sheath around the arc between it and at least the initial portion of the inner wall of the nozzle to thereby constrict the arc and cause the same to extend at least part way down the interior of the nozzle, said plasma forming gas being passed through the nozzle at a velocity sufficient to pass out of the nozzle and out of contact with the arc in the form of a free plasma stream.

25. Method according to claim 24 in which the plasma forming gas is passed through and out of the nozzle at a velocity of at least 5 feet per second.

26. Method according to claim 25 in which the plasma forming gas is passed through and out of the nozzle at a velocity of at least 50 feet per second.

27. Method according to claim 24 in which the nozzle-shaped electrode is an elongated nozzle-shaped electrode and in which the plasma forming gas is passed in the form of a sheath around the arc between it and a major portion of the inner wall of the nozzle.

28. Method according to claim 27 in which the plasma forming gas is passed in the form of a sheath between the arc and substantially the entire inner wall of the nozzle causing the arc to strike at the outlet end of the nozzle.

29. Method according to claim 24 in which said plasma forming gas is a member selected from the group consisting of nitrogen, hydrogen and mixtures thereof.

30. Method according to claim 24 in which the arc forming electric current is passed from a rod-shaped electrode across a gap to said nozzle-shaped electrode and which includes passing a further separate protective sheath of a gas less reactive than said plasma forming gas around at least a portion of said rod-shaped electrode.

31. Method according to claim 24 in which said arc forming electric current is passed from a rod-shaped electrode to said nozzle-shaped electrode and in which said plasma forming gas is additionally passed around at least a portion of said rod-shaped electrode.

32. Method for heating a material which comprises forming an arc in a confined zone by passing an arc forming electric current across a gap in said zone to a nozzle-shaped electrode, and passing a plasma forming gas into said zone and through said nozzle in the form of a sheath around the arc between it and at least the initial portion of the inner wall of the nozzle to thereby constrict the arc causing the same to extend at least part way down the interior of the nozzle, said plasma forming gas being passed through the nozzle at a velocity sufficient to pass out of the nozzle and out of contact with the arc in the form of a free plasma stream, and directing the free plasma stream against the material to be heated.

33. Method according to claim 32 in which the plasma forming gas is passed through and out of the nozzle at a velocity of at least 5 feet per second.

34. Method according to claim 33 in which the plasma forming gas is passed through and out of the nozzle at a velocity of at least 50 feet per second.

35. Method according to claim 32 in which the nozzle-shaped electrode is an elongated nozzle-shaped electrode and in which the plasma forming gas is passed in the form of a sheath around the arc between it and a major portion of the inner wall of the nozzle.

References Cited in the file of this patent

UNITED STATES PATENTS

| | | |
|---|---|---|
| 1,002,721 | Mathers | Sept. 5, 1911 |
| 2,587,331 | Jordan | Feb. 26, 1952 |
| 2,640,135 | Cobine | May 26, 1953 |
| 2,768,279 | Rava | Oct. 23, 1956 |
| 2,769,079 | Briggs | Oct. 30, 1956 |
| 2,770,708 | Briggs | Nov. 13, 1956 |
| 2,806,124 | Gage | Sept. 10, 1957 |
| 2,819,423 | Clark | Jan. 7, 1958 |
| 2,858,411 | Gage | Oct. 28, 1958 |
| 2,874,265 | Reed et al. | Feb. 17, 1959 |
| 2,922,869 | Giannini et al. | Jan. 26, 1960 |

FOREIGN PATENTS

| | | |
|---|---|---|
| 769,879 | Great Britain | Mar. 13, 1957 |